M. F. OWENS & A. T. MARSHALL.
STARTING DEVICE FOR ELECTRIC MOTORS.
APPLICATION FILED APR. 12, 1910.

1,033,117.

Patented July 23, 1912.

UNITED STATES PATENT OFFICE.

MICHAEL F. OWENS AND ALBERT T. MARSHALL, OF HARTFORD, CONNECTICUT, ASSIGNORS TO AUTOMATIC REFRIGERATING COMPANY, OF HARTFORD, CONNECTICUT, A CORPORATION OF NEW JERSEY.

STARTING DEVICE FOR ELECTRIC MOTORS.

1,033,117.   Specification of Letters Patent.   Patented July 23, 1912.

Application filed April 12, 1910. Serial No. 554,983.

*To all whom it may concern:*

Be it known that we, MICHAEL F. OWENS and ALBERT T. MARSHALL, both citizens of the United States, and residing at Hartford, county of Hartford, and State of Connecticut, have invented certain new and useful Improvements in Starting Devices for Electric Motors, of which the following is a full and clear specification, the novel features thereof being more fully pointed out in the annexed claims.

Our invention relates to a starting device for electric motors, of the type by which the motor is started without a starting resistance.

In cases of electric power transmission in which the electric motor is only intermittently employed, but frequently started it is desirable to start the motor without a so-called starting resistance by simply throwing the motor across the line, and for this reason motors have been designed which can be thrown into circuit in such manner without damage to the windings owing to the increase of current during the starting period. Normally these motors as is usually done, are protected by a fuse from too strong a current, which melts or otherwise cuts off the current from the motor upon increase beyond the amount of current which the motor should carry under normal running conditions. Fuses of such size, however, are obviously unsuited for carrying the starting current which is many times the amount which the motor normally carries and for this reason it has been suggested to employ during the starting period heavy fuses which will during this period admit a larger amount of current, and to substitute the lighter normal fuses after the motor has reached its normal speed.

The particular features of this invention relate to a device by which, in starting electro-motors of the character described, automatically a heavy fuse is thrown into the circuit at the starting. After the motor has attained its normal speed light fuses are thrown into the circuit of the motor through which the normal motor current must then pass so that under normal running conditions these light fuses will protect the motor in the usual way.

We have illustrated in the accompanying drawings various arrangements by which our invention may be reduced to practice, but these particular arrangements while preferred forms, are not meant to constitute the only arrangements by which the purpose of the invention may be obtained.

In these drawings.

In the modification shown in Fig. 1, 1, 2, 3 and 4 represent the mains which supply current to the motor 5 which in this particular instance is represented by a two phase alternating current motor. The mains are connected and disconnected simultaneously by the main switch 6. The heavy fuses 7, one in each main, are located in front of hand operated main switch 6. 8 represents the automatically operating switch for throwing the heavy fuses 7 into the motor circuit and 9 represents the switch for throwing the normal or running fuses 10 into the motor circuit. Both automatic switches are arranged in multiple to the lines which they control. Switches 8 and 9 are shown here as so-called toggle joint switches which are well known in the art, controlled by the vertically operating solenoid cores 11 and 12 of solenoids 13 and 14 respectively. At the lower ends of cores 11 and 12 double contact arms 15 and 16, respectively, are provided by which the circuits hereinafter referred to in detail are controlled.

Inasmuch as this whole device is employed with particular advantage for starting electromotors operating refrigerating machines, we have shown at 17 a thermostat arm, controlled by the temperature of the refrigerating plant, which coöperates with the contacts "Start" and "Stop" in the manner hereinafter described in detail. A branch line 18 controlled by a switch 19 which is normally closed leads from main line 1 to the thermostat arm. When the motor is at rest and the thermostat arm 17 in the middle between its contacts "Start" and "Stop", both automatic switches 8 and 9 are in the "open" position shown in Fig. 1, solenoids 13 and 14 being then deënergized, main switch 6 assumed to be closed. If now thermostat arm 17 moves onto its "start" contact the following circuit is closed: from line 1 over switch 19, branch 18, to thermostat arm 17, thence over contact "Start" to solenoid 13, thence to contact 20 (then closed by the lower contact arm 16), thence over upper running fuse $10^a$, back to line 2. By this current solenoid 13 is energized and by the action of its core 11, switch 8 is thrown onto its contacts $8^a$ and $8^b$. Now two direct circuits are closed: from line 2 over the heavy fuse 7, contact $8^a$, switch 8, branch 21, line 22, motor 5, and back to line 1; also the circuit: from line 4, over its heavy fuse 7 to switch terminal $8^b$, switch 8, branch 23, motor line 24, motor 5, back to main line 3. Thus the motor 5 is connected to lines 1, 2, 3, 4 with a heavy fuse 7 interposed in each line, no current supplied to the motor flowing as yet through light fuses $10^a$, $10^b$. The motor 5 now receives a strong rush of current and will gradually get under way. By the closing of the circuit 2, $8^a$, 21, 22, 1, a small solenoid 25 connected in multiple to this circuit is energized. The operation of this solenoid is controlled by a dash pot 26 to which its solenoid core 27 is connected so that upon energizing of solenoid 25 the core will only gradually move upward within a predetermined time interval which may be regulated in any suitable manner well known in the art in this kind of device. To solenoid core 27 a contact arm 28 is connected which, when the solenoid has moved its core into the uppermost position, closes contacts 29. Therefore, when as described above, the motor circuit through main lines 1 and 2 is closed, solenoid 25 is energized thereby and commences to raise contact arm 28 until after the predetermined time interval (which is preferably equal to the time within which the motor under normal conditions assumes its normal running speed) this arm closes contacts 29, thereby completing the following circuit: from line 1, over switch 19, line 18, contacts 29, branch 30, solenoid 14, contacts 31 (then closed by the upper contact arm 15, solenoid core 11 being then raised), branch 32, upper terminal of resistance 33, running fuse $10^a$, back to line 2. This circuit thus closed will energize solenoid 14 which in raising its armature 12 throws switch 9 in multiple with switch 8. When armature 12 is thus raised, it will be noted that lower contact arm 16 is lifted off contacts 20 and the upper contact arm 16 closes contacts 34. The opening of contacts 20 has the effect of opening the circuit through solenoid 13 so that the latter becomes deënergized and causes switch 8 to open. The closing of terminals 34 by the arm 16 has the effect of setting a circuit leading over the "stop" contact of thermostat 7 which will be referred to hereinafter in detail. When in opening switch 8 solenoid core 11 drops down, its upper contact arm 15 opens contacts 31. This has the effect of throwing a resistance 33 in series with solenoid 14 by which an amount of current is allowed to pass through solenoid 14, just sufficient to retain its core or armature in raised position in which switch 9 is closed. The two arms of switch 9 being connected by branches 35 and 36 with lines 22 and 24 respectively, it will be noted that, switch 8 being open, the motor current flowing from main lines 2 and 4 over lines 22 and 24 respectively, to motor 5, will now pass through the normal running fuses $10^a$ and $10^b$ so that now the motor is protected during its normal operation by these fuses. If now the refrigerating plant requires the stopping of the motor the thermostat arm 17 moves onto its "stop" contact whereby the following circuit is closed: from main line 1 over switch 19, line 18, thermostat arm 17, "stop", contacts 34 (then closed) resistance 33, fuse $10^a$, main line 2. Thus it will be noted that by this circuit solenoid 14 is short circuited which will cause a dropping of its core 12 and thus switch 9 to open its contacts $9^a$ and $9^b$, by which the current leading from lines 1, 2, 3 and 4 to the motor is interrupted. Thereupon also solenoid 25 will be deënergized and core 27, by dropping down will open contacts 29. Thus all the elements are returned into the position shown in Fig. 1.

Figure 1:
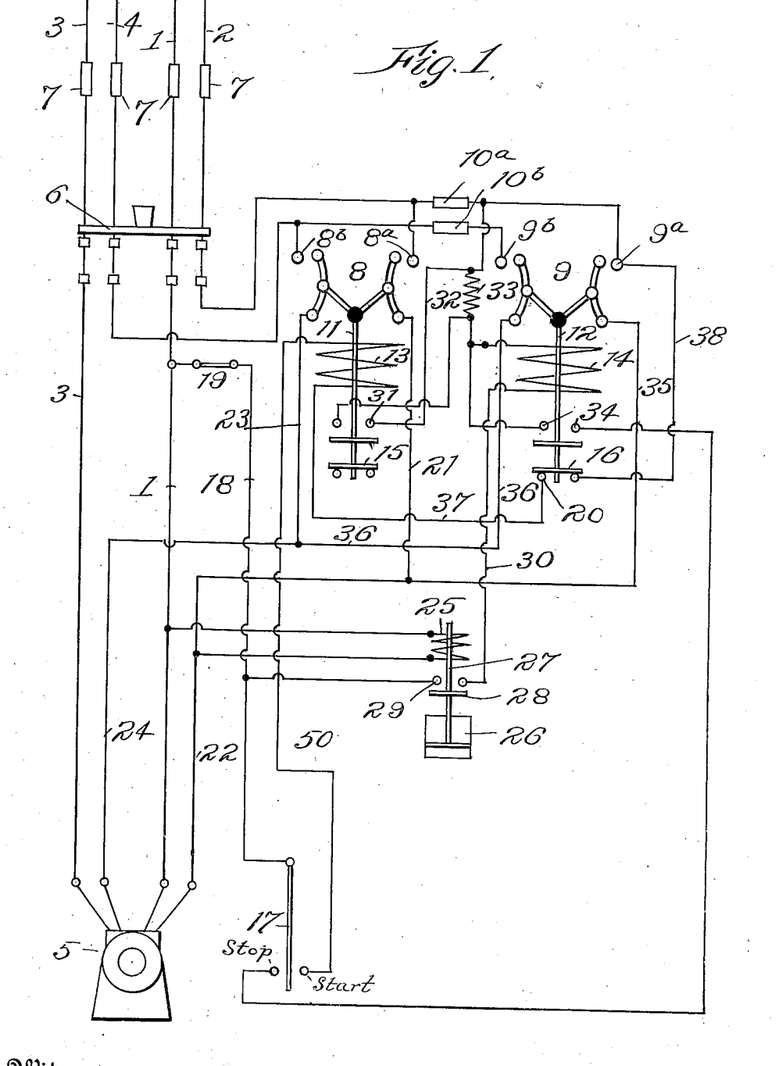
Figure 1 shows a diagrammatical illustration of the device in which the heavy fuse is first thrown automatically into circuit and after a predetermined time, controlled by a dash pot, the lighter fuse is thrown in series with the heavy fuse.
Figure 2:
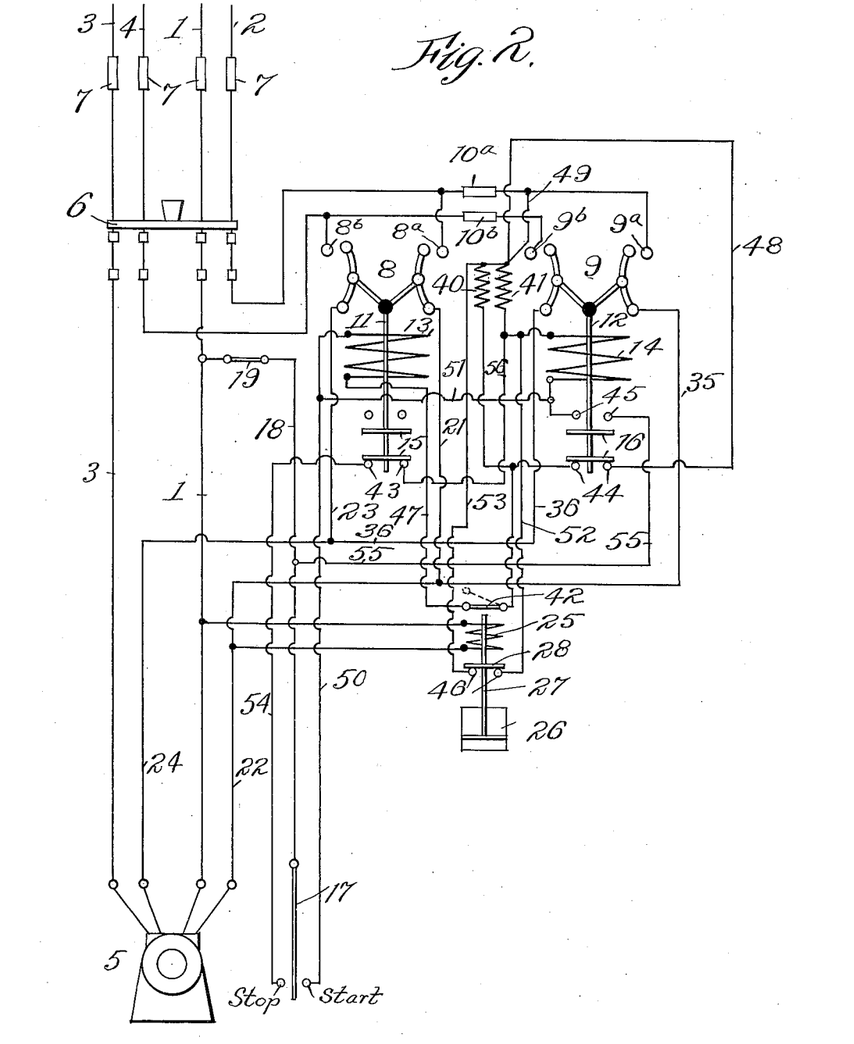
Fig. 2 shows a modification of the arrangement shown in Fig. 1 in which the heavy and the light fuses are automatically thrown in multiple into the circuit at the same time when the motor starts, and in which, after a dash pot-controlled period these fuses are thrown in series.

The modification shown in Fig. 2 contains the same principal elements as shown and described with reference to Fig. 1 and they are therefore indicated with the same reference numerals. The particular feature of this modification is that both switches 8 and 9 are thrown in simultaneously when the thermostat moves onto its "start" contact so that thereby all the current must pass through the heavy fuses 7 during the starting period but a part of the current will also pass through the light fuses 10ᵃ, 10ᵇ and thence over switch 9 to the motor. After the motor has attained its full speed for which time period the dash pot 26 is set, solenoid 25 connected with the dash pot interrupts the current at contacts 46 through lifting of cross arm 28 and also opens switch 42 which is normally closed. Instead of resistance 33 connected with solenoid 14 as shown in Fig. 1 two resistances 40 and 41 are provided, connected in the manner as will be described in the following operation of the device. Before starting the motor all the switches are in the following condition: Switch 19 leading to the thermostat 17 is closed, also switch 42 coöperating with the dash pot solenoid, and contact arm 28 of this solenoid rests on its contacts 46, the lower contact arms 15 and 16 of solenoid cores 11 and 12 rest upon their respective contacts 43 and 44, switches 8 and 9 are open, main switch 6 is assumed to be closed. If now the thermostat arm 17 moves onto its "start" contact the following circuit is first closed thereby; from line 1 over heavy fuse 7, switch 19, thermostat 17, solenoid 13, conductor 47, switch 42, across contacts 44, conductor 48, upper terminals of resistances 40, 41, conductor 49, light fuse 10ᵃ, and cut to line 2. In multiple with this circuit is the circuit through solenoid 14 which branches off from conductor 50 by way of conductor 51, solenoid 14, conductor 52, over contacts 46, conductor 53, to the upper terminals of resistances 40, 41, where it joins conductor 49. By these two branches of the current solenoids 13 and 14 are simultaneously energized and thereby their switches 8 and 9 respectively are closed at contacts 8ᵃ, 8ᵇ and 9ᵃ, 9ᵇ. The closing of switches 8 and 9 connects the motor 5 to lines 1, 2, 3, 4 so that the motor will start. Core 12 of solenoid 14 when raised, lifts its lower contact arm 16 off contacts 44 thereby interrupting the direct connection from solenoid 13 (then also energized) over switch 42, conductors 48, 49, to line 2, and instead throws resistance 40 into the circuit leading from the solenoid 13 to line 2. This resistance is dimensioned so that sufficient current is still permitted to flow through the solenoid to hold switch 8 closed, but overloading of the solenoid with the amount of current necessary to raise its core is avoided during the rest of the period within which switch 8 is closed. As mentioned at the beginning of the description of this modification, the heavy fuses 7 of lines 1, 2, 3, 4 now carry the full motor starting current, part of it, however, also flowing through light fuses 10ᵃ and 10ᵇ and through switch 9 and conductors 35 and 36 connected therewith to the motor. At the same time, solenoid 25, up to the present without current, is energized and tends to raise its armature within the time interval for which the dash pot is set and which is equal to the time within which the motor has supposedly attained its full speed. At the end of the lifting stroke of armature 27 its cross arm 28 is lifted off contacts 46 and switch 42 is pushed open. The opening of switch 42 has the effect of interrupting the circuit through solenoid 13 so that the switch 8 controlled by the latter will be thrown open, thereby causing armature 11 of solenoid 13 to lay its lower contact arm 15 across contacts 43 and thereby setting the circuit for the "stop" contact of the thermostat which will be referred to hereinafter. The opening of the contacts 46 by arm 28 previously referred to, has the effect of throwing resistance 41 in series with the current passing through solenoid 14 so that, owing to the dimensioning of resistance 41, just enough current passes through solenoid 14 to hold its armature attracted and thus switch 9 closed without overloading the solenoid with current. By thus deënergizing solenoid 13 causing switch 8 to open, it will be seen that the branch of the motor circuit leading from lines 2 and 4 directly to the motor is interrupted and all the current now must pass through light running fuses 10ᵃ and 10ᵇ which now control the maximum current flowing to the motor. When armature 12 of solenoid 14 is raised to retain its switch 9 in closed position, the upper contact arm 16 of this armature is thereby held across contacts 45 whereby the following circuit is closed: line 1, switch 19, conductor 18, branch 55, contacts 45, solenoid 14, resistance 41, conductor 49, fuse 10ᵃ, and line 2. This circuit is necessary because if thermostat arm 17 only moves away from its "start" contact, solenoid 14 should not be deënergized thereby and the motor thus stopped. By providing this shunt just described to thermostat arm 17 and the "start" contact, this purpose is attained. If now the thermostat arm 17 moves over onto the "stop" contact the following circuit is closed: line 1, switch 19, thermostat 17, conductor 54, contacts 43 (then closed), conductor 56, resistance 41, conductor 49, fuse 10ᵃ, line 2. This circuit short-circuits solenoid 14 so that it is deënergized and will drop its core 12 and open switch 9 and interrupt the motor current. In dropping core 12 opens contacts 45 by removing upper contact arm 16 and closes contacts 44 by laying its lower arm 16 across these contacts. The normal resting condition of the system is now restored because by interrupting the lower circuit also solenoid 25 will be deënergized and its core 27 in gradually dropping, will also close switch 42 and contacts 46.

Figure 3:
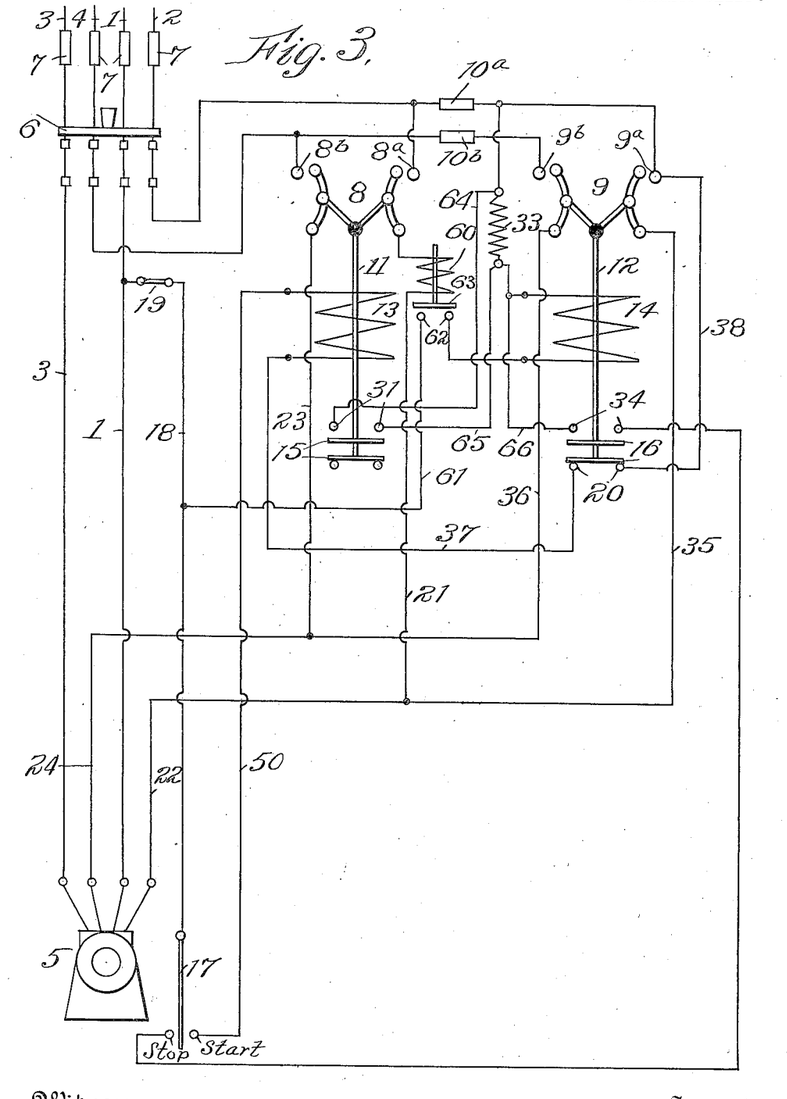
Fig. 3 shows a modification of the arrangement shown in Fig. 1 in which the heavy fuse is thrown into circuit at the starting and in which, upon decrease of the current during the starting period the light fuse is automatically thrown in series with the heavy fuses, this operation being controlled by a solenoid responsive to decrease in current.

The modification shown in Fig. 3 is also similar to that shown in Fig. 1 in its elements, in particular also similar to the modification shown in Fig. 1, in so far as switch 8 closes first, thereby connecting the motor with the line through the heavy fuses only, and after the motor has gotten under way and attained its full speed switch 9 is thrown in, which connects the motor with the line through the light fuses and thereafter switch 8 is thrown out, so that then the light fuses 10ᵃ, 10ᵇ alone carry the whole motor current. The particular feature of this modification consists in providing an auxiliary solenoid 60 connected in circuit with one of the arms of switch 8 and responsive to current intensity and dimensions so that it will be fully energized only by the strong starting current flowing through switch 8, but when this current decreases as the motor attains its full speed, it will drop its core and thereby close the circuit through the solenoid controlling switch 9 which throws the light fuses into circuit. By this arrangement the dash pot controlled solenoid 25 shown in Figs. 1 and 2 is rendered unnecessary. Otherwise the arrangement of the elements is similar to that shown in Fig. 1. The operation of the device shown in Fig. 3 is as follows: In the normal resting condition as shown in Fig. 3, switch 19 is closed, thermostat arm 17 in the middle position, switches 8 and 9 are open so that contacts 31 controlled by solenoid core 11, and contacts 34 controlled by solenoid core 12, are open, contacts 20 controlled by solenoid core 13 are closed, the lower arm 16 of this core extending across these two contacts. Auxiliary solenoid 60 is deënergized so that the contact arm 63 of its core is resting across contacts 62. Main switch 6 is assumed to be closed. If now thermostat arm 17 moves onto the "start" contact, first the following circuit is closed: line 1, switch 19, conductor 18, thermostat arm 17, "start", conductor 50, solenoid 13, conductor 37, contacts 20, conductor 38, contact 9ᵃ, fuse 10ᵃ, out through line 2. This circuit energizes solenoid 13 whereby switch 8 is closed in the manner above described so that now the motor is connected directly to lines 1, 2, 3, and 4 through this switch with only the heavy fuses in circuit. The strong starting circuit, flowing through conductors 21 and 22, to or from the motor, energizes solenoid 60 whereby contact arm 63 is lifted off contacts 62 and interrupts the small current flowing from conductor 18 over the branch 61, contact 62, solenoid 14, resistance 33, fuse 10ᵃ, to line 2, which current however, owing to resistance 33 being interposed is not strong enough to already energize solenoid 14 sufficiently to close its switch 9. When core 11 of solenoid 13 is thus raised, its upper contact arm 15 closes contacts 31 by which resistance 33 is short-circuited. When the starting current has decreased to normal, caused by the motor attaining its normal speed, solenoid 60, only responsive to the strong starting current will drop its core and thereby lay contact arm 63 again across contact 62 which closes the branch circuit leading from conductor 18 over conductor 61, contact 62, solenoid 14, conductor 65, contacts 31, conductor 64, light fuse 10ᵃ, to line 2. The current flowing through this circuit is sufficiently strong to now energize solenoid 14 and there close switch 9 in the manner described with reference to Fig. 1. When core 12 of solenoid 14 is thus raised its lower contact arm 16 is lifted off contacts 20 whereby the current through solenoid 13 is interrupted and the latter deënergized so that its switch 8 is opened thereby. The direct connection of the motor with lines 2 and 4 over heavy fuses 7 only is now interrupted and all the current flowing from these two lines to the motor must pass through the light running fuses 10ᵃ, 10ᵇ over switch 9. Solenoid core 11 when dropping removes its upper contact 15 from contacts 31 and opens thereby the short-circuit to resistance 33. This will throw this resistance again in series with solenoid coil 14 and thereby limit the amount of current to only such as is necessary to hold switch 9 closed. Core 12 in this raised position closes with its upper contract arm 16 contacts 34, by which the circuit through the "stop" contact of the thermostat is set, so that when arm 17 moves onto this contact, solenoid 14 is short-circuited by the circuit from conductor 18 over thermostat 17, "stop", contacts 34, to resistance 33, in similar manner as described with reference to Fig. 1. This will deënergize solenoid 14 and switch 9 will be opened and the motor 5 be stopped. Now all the elements are again in their normal resting position and the device is ready to start the motor when thermostat arm 17 again moves to the "start" contact.

Figure 4:
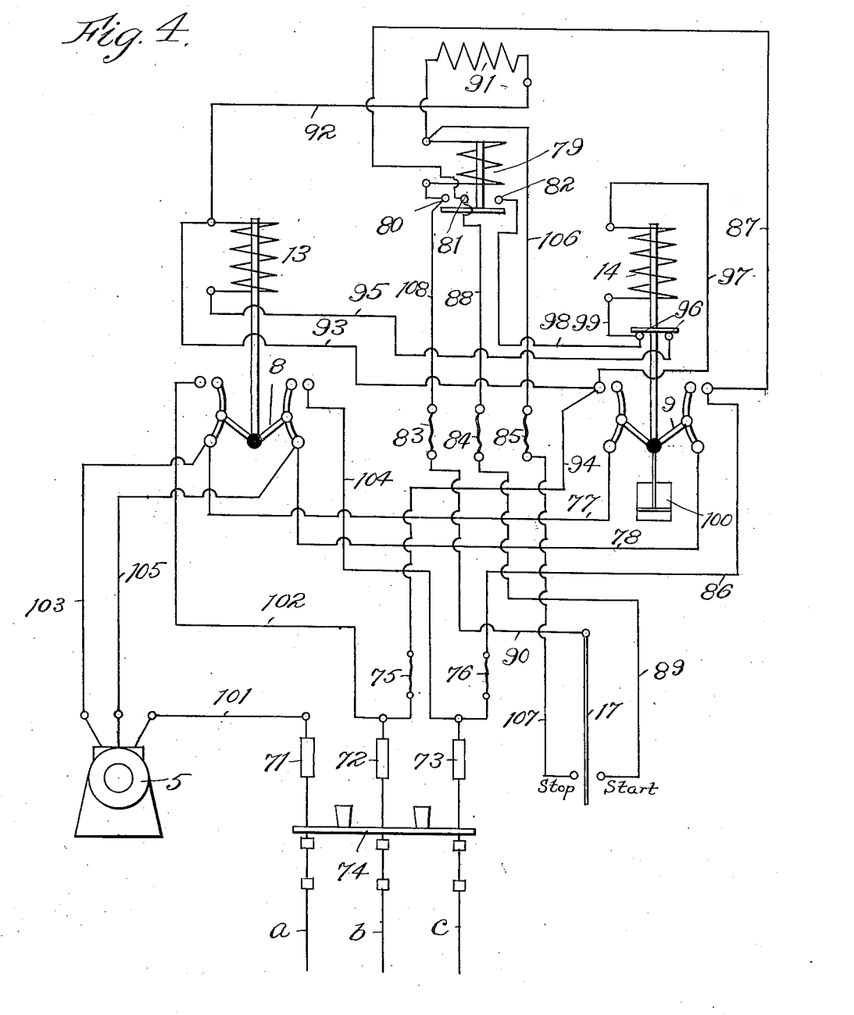
Fig. 4 shows a modification in which the solenoids of the heavy and light fuse switches are energized simultaneously but the operation of the light fuse switch retarded by a dash pot.

In Fig. 4 we have shown a modification in which the solenoids of both the heavy and the light fuse switch are energized simultaneously, but in order to cause the latter switch to only close after a suitable time interval within which the motor has attained its full speed, a dash pot is attached to the light fuse switch by which its closing is retarded as desired. In this figure the main elements such as the motor 5, the main switch 74 and the heavy and light fuse switches, may all be the same as previously shown and described. The starting device, however, is applied to a three phase alternating current motor. The heavy fuses are shown at 71, 72, 73 and the light fuses at 75 and 76. The heavy and light fuse switches 8 and 9 respectively, are connected in multiple by conductors 77 and 78. The light fuses 75 and 76 are located in phases $b$ and $c$ respectively, both phases being connected to the motor either by switch 8 or 9 as will be hereinafter explained. Similar to the arrangement shown in the other modifications a thermostat arm 17 is employed to start or stop the motor when desired. An auxiliary solenoid 79 is provided by means of which the contacts 80, 81, 82 are connected together when the solenoid is energized. Moreover three fuses 83, 84, 85 are provided in the auxiliary circuits hereinafter to be described to prevent an undue increase of current in the circuits caused by short circuits or the like. Main hand switch 74 is assumed to be closed and switches 8 and 9 open and solenoid 79 deënergized. Then the operation of the device according to Fig. 4 is as follows: When the thermostat arm 17 moves onto the "start" contact then the following circuit is first closed: from phase $c$ heavy fuse 73, light fuse 76, conductors 86 and 87, contact 81, conductors 88, fuse 84, conductor 89, "start", arm 17, conductor 90, fuse 83, contact 80, solenoid 79, resistance 91, conductors 92, 93, 94, light fuse 75, heavy fuse 72, phase $b$. The current flowing through this circuit energizes the solenoid 79. A branch circuit also flows from conductor 92 over solenoid 13, conductor 95, contacts 96 (then closed) solenoid 14, conductors 97, 94 to phase $b$. However, this circuit, owing to the main circuit flowing directly from conductor 92 to phase $b$ does not carry sufficient current to energize solenoids 13 and 14 which are then both connected in series. Through the energizing of solenoid 79 its armature is attracted and connects contacts 80, 81, 82. Thereby the following circuit is closed: phase $c$, fuses 73, 76, conductors 86, 87, contacts 81, 80, solenoid 79, resistance 91, conductors 92, 93, 94, fuses 75, 72, phase $b$. From conductor 87 another circuit branches off which leads from contact 81 over contact 82, conductors 98, 99, solenoid 14, conductors 97, 94, fuses 75, 72 to phase $b$, and another branch circuit leading from contacts 96 (then still closed) over conductor 95, solenoid 13, conductors 93, 94, fuses 75 and 72, also to phase $b$. Solenoids 13 and 14 being now in parallel and having the resistance 91 only in parallel, they are sufficiently energized to attract their armatures and close their switches 8 and 9 respectively. However, switch 9 will not be immediately closed on account of a dash pot 100 being attached to this switch which retards the operation of the solenoid, but switch 8, being instantaneously closed, thereby establishes the following connection between phases $a$, $b$ and $c$ and the motor. Phase $a$ is directly connected with the motor through the heavy fuse 71 and conductor 101. The connection of phase $b$ runs over heavy fuse 72, conductor 102, switch 8, conductor 103 to the motor. The connection of phase $c$ runs over heavy fuse 73, conductor 104, switch 8, conductor 105, to the motor. Thus the motor is able to start with only the heavy fuses 71, 72, 73 in circuit to receive the full starting current while light running fuses 75, 76 do not take part as yet in carrying the motor current. The dash pot 100, controlling switch 9, is adjusted so that it will permit solenoid 14 to close switch 9 after sufficient time has elapsed within which the motor can attain its full speed. Through the closing of switch 9 the light running fuses 75, 76 are thrown into the motor circuit but as yet only in shunt with the heavy fuses, through conductors 86 and 94. But at the moment switch 9 fully closes, the connection between the contacts 96 is interrupted which in turn disconnects solenoid 13 from the circuit previously traced which energizes solenoids 13 and 14, so that switch 8 is thrown open and thus the direct connection between heavy fuses 72 and 73 and the motor is interrupted and all the current passing through phases $b$ and $c$ must also pass through light running fuses 75 and 76. Contacts 80, 81, 82 remaining still connected, the thermostat arm 17 may move from the "start" contact without interrupting the current through solenoid 79. The motor now runs with running fuses 75, 76 in phases $b$ and $c$ as safeguard. If now the thermostat arm 17 moves onto the "stop" contact solenoid 79 is short circuited by the following connection: from contacts 81, 80 over conductor 108, fuse 83, conductor 90, arm 17, "stop", conductor 107, fuse 85, conductor 106 to resistance 91. This deënergizes solenoid 79 and by dropping its armature the connection between contacts 80, 81, 82 is interrupted. This also interrupts the circuit through solenoid 14 so that upon deenergizing of the latter its switch 9 will be thrown open and the current from phases $b$ and $c$ to the motor interrupted. By throwing switch 9 open contacts 96 are again connected and the device is returned thus into its normal position ready to again start the motor when the thermostat moves onto the "start" contact.

In the arrangement shown in Fig. 4 it will be noted that, with the motor running at its normal speed and the current of phases $b$ and $c$ flowing through light running fuses 75 and 76, in case either of these two fuses should blow, the auxiliary circuits through which current is supplied to solenoid 14 are interrupted, so that switch 9 must be thrown open. For instance assuming through some cause light fuse 75 should blow when the motor is running at normal speed; this will interrupt the auxiliary circuit running from phase $c$ over fuse 76, conductors 86, 87, contacts 81, 82, conductors 98, 99, solenoid 14, conductors 97 and 94; or assuming fuse 76 to blow; this will interrupt the current flowing over this fuse and conductors 86, 87 to solenoids 79 and 14. Thus in both instances the current through solenoid 14 is interrupted and this solenoid deënergized. Likewise the circuit is broken which is otherwise closed as soon as the thermostat moves onto the "start" contact; thereby the thermostat is prevented from starting the motor should the temperature rise sufficiently to move it to "Start," so long as either of the two fuses is not in proper condition.

While we have shown by the four modifications arrangements which more or less suit particular purposes and are meant to represent preferred forms in which our invention may be reduced to practice, it is obvious that the invention is not limited to the particular arrangement so far as the connections are concerned, but these connections may vary according to the purpose for which the device is employed. Moreover while the several modifications have been illustrated as employed for the control of a two-phase and a three-phase A. C. motor, it is obvious to anyone skilled in the art, that any of the modifications or arrangements embodying our novel idea may be employed for any multiple or also single phase motor, without changing any of the connections within the fuse control system itself. For instance for employing the system shown in Fig. 4 for a single phase A. C. motor merely conductor 101 is omitted, assuming then motor 5 shown in this figure being a single phase A. C. motor.

What we claim is:

1. In a motor starting device of the character described, the combination with an electro-motor, heavy starting fuses adapted to carry the starting current for said motor, light running fuses adapted to only carry the normal running current, and means controlled by a portion of the current supplied through said heavy fuses for automatically and successively throwing the motor into control of said heavy fuses during the starting period and for throwing the motor into control of said light fuses after a predetermined period.

2. In a motor starting device of the character described, the combination with an electro-motor, heavy starting fuses adapted to carry the starting current for said motor, light running fuses adapted to only carry the normal running current, circuits connecting both kinds of said fuses with said motor and switches in said circuits for throwing the motor into control of said heavy fuses during the starting period and for throwing the motor into control of said light fuses after the motor has attained its normal speed, solenoids and circuits containing said solenoids, connected with said motor circuits and interdependent on each other for automatically and successively operating said switches.

3. In a motor starting device of the character described, the combination with an electro-motor, heavy starting fuses adapted to carry the starting current for said motor, light running fuses adapted to only carry the normal running current, circuits connecting both kinds of said fuses with said motor, switches in said circuits for throwing the motor into control of said heavy fuses during the starting period and for throwing said light fuses in series with said heavy fuses to carry the full normal motor current after the motor has attained its normal speed, solenoids, and circuits containing said solenoids and connected with said motor circuits and interdependent on each other, for automatically and successively operating said switches.

4. In a motor starting device of the character described, the combination with an electro-motor, heavy starting fuses adapted to carry the starting current for said motor, light running fuses adapted to only carry the normal running current, circuits connecting both kinds of said fuses in series with said motor, a branch circuit leading from points of said circuits between said heavy and said light fuses to connect the heavy fuses directly to the motor, a switch interposed in said branch circuit for closing and opening it, a solenoid for operating said switch, a switch between said light fuses and the motor and a second solenoid for operating this switch, both of said solenoids suitably connected to the motor circuits, a starting switch for closing the solenoid circuit controlling the heavy fuse switch to start the motor, and means for permitting the closing of the light fuse switch controlled by said second solenoid only after a predetermined time, said second solenoid having means on its core for opening, when energized and closing said switch, the circuit through the first solenoid, to open the heavy fuse switch and throw the heavy and the light fuses in series.

5. In a motor starting device of the character described, the combination with an electro-motor, heavy starting fuses adapted to carry the starting current for said motor, light running fuses adapted to only carry the normal running current, a circuit connecting said heavy fuses directly with said motor and a solenoid-operated switch interposed in said circuit, a second circuit connecting said heavy and said light fuses in series with said motor and a second solenoid-operated switch interposed in said second circuit, auxiliary circuits and means for closing said circuits by which the solenoids of both of said switches are simultaneously energized to close their switches, means for retarding the operation of said second-named switch during the starting period of the motor, and means coöperating with said second switch when closed, for interrupting the circuit through said first solenoid to open its switch and permit the entire motor current to flow through said light and heavy fuses in series after the motor has attained its normal speed.

6. In a motor starting device of the character described, the combination with an electro-motor, heavy starting fuses adapted to carry the starting current for said motor, light running fuses adapted to only carry the normal running current, a circuit connecting said heavy fuses directly with said motor and a solenoid-operated switch interposed in said circuit, a second circuit connecting said heavy and said light fuses in series with said motor and a second solenoid-operated switch interposed in said second circuit, auxiliary circuits and means for closing said circuits by which the solenoids of both of said switches are simultaneously energized to close their switches, means for retarding the operation of said second-named switch during the starting period of the motor, and means coöperating with said second switch when closed, for interrupting the circuit through said first solenoid to open its switch and permit the entire motor current to flow through said light and heavy fuses in series after the motor has attained its normal speed, said auxiliary circuits remaining broken so long as any of said light fuses is broken.

MICHAEL F. OWENS.
ALBERT T. MARSHALL.

Witnesses:
H. H. MARSHALL,
A. C. CULVER.